(12) United States Patent
Czaplicki

(10) Patent No.: US 9,683,149 B2
(45) Date of Patent: Jun. 20, 2017

(54) ORIENTED STRUCTURAL ADHESIVES

(75) Inventor: Michael Czaplicki, Molsheim (FR)

(73) Assignee: ZEPHYROS, INC., Romeo, MI (US)

( * ) Notice: Subject to any disclaimer, the term of this patent is extended or adjusted under 35 U.S.C. 154(b) by 118 days.

(21) Appl. No.: 13/812,055

(22) PCT Filed: Jul. 26, 2011

(86) PCT No.: PCT/EP2011/003736
§ 371 (c)(1),
(2), (4) Date: Feb. 11, 2013

(87) PCT Pub. No.: WO2012/013330
PCT Pub. Date: Feb. 2, 2012

(65) Prior Publication Data
US 2013/0206333 A1  Aug. 15, 2013

(30) Foreign Application Priority Data
Jul. 27, 2010 (GB) .................... 1012595.3

(51) Int. Cl.
C09J 171/08 (2006.01)
C09J 5/06 (2006.01)
C09J 171/00 (2006.01)

(52) U.S. Cl.
CPC ........... *C09J 171/08* (2013.01); *C09J 5/06* (2013.01); *C09J 171/00* (2013.01); *C08G 2650/56* (2013.01); *C09J 2400/226* (2013.01); *Y10T 156/10* (2015.01)

(58) Field of Classification Search
CPC ................................. C09J 171/08; C09J 5/06
See application file for complete search history.

(56) References Cited

U.S. PATENT DOCUMENTS

| | | |
|---|---|---|
| 3,649,714 A | 3/1972 | Wangsness |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,304,709 A | 12/1981 | Salee |
| 4,306,040 A | 12/1981 | Baer |
| 4,495,324 A | 1/1985 | Chacko et al. |
| 4,536,436 A | 8/1985 | Maeoka et al. |
| 4,766,183 A | 8/1988 | Rizk et al. |
| 4,923,934 A | 5/1990 | Werner |
| 5,086,088 A | 2/1992 | Kitano et al. |
| 5,145,935 A | 9/1992 | Hayashi |
| 5,275,853 A | 1/1994 | Silvis et al. |
| 5,331,062 A | 7/1994 | Sorathia et al. |
| 5,464,924 A | 11/1995 | Silvis et al. |
| 5,763,529 A | 6/1998 | Lucas |
| 5,962,093 A | 10/1999 | White et al. |
| 5,965,256 A | 10/1999 | Barrera |
| 6,136,398 A | 10/2000 | Willett et al. |
| 6,388,043 B1 | 5/2002 | Langer et al. |
| 6,734,263 B2 | 5/2004 | Eadara et al. |
| 6,793,274 B2 | 9/2004 | Riley et al. |
| 7,025,409 B2 | 4/2006 | Riley et al. |
| 7,114,763 B2 | 10/2006 | Riley et al. |
| 7,288,604 B2 | 10/2007 | Kuntimaddi et al. |
| 7,735,906 B2 | 6/2010 | Takahashi et al. |
| 8,105,460 B2 | 1/2012 | Sheasley |
| 8,163,116 B2 | 4/2012 | Riley |
| 2003/0090129 A1 | 5/2003 | Riley et al. |
| 2003/0119987 A1 | 6/2003 | Eadara et al. |
| 2004/0033324 A1 | 2/2004 | Meyer |
| 2004/0204551 A1 | 10/2004 | Czaplicki et al. |
| 2004/0212220 A1 | 10/2004 | Riley et al. |
| 2005/0017543 A1 | 1/2005 | Riely et al. |
| 2005/0198907 A1 | 9/2005 | McKnight et al. |
| 2007/0191556 A1 | 8/2007 | Eger |
| 2007/0281523 A1 | 12/2007 | Riley |
| 2008/0060742 A1 | 3/2008 | Sheasley et al. |
| 2008/0257094 A1 | 10/2008 | Xie et al. |
| 2008/0257485 A1 | 10/2008 | Xie et al. |
| 2008/0262188 A1 | 10/2008 | Xie et al. |
| 2008/0269420 A1 | 10/2008 | Tong et al. |
| 2008/0308212 A1 | 12/2008 | Sheasley et al. |

(Continued)

FOREIGN PATENT DOCUMENTS

| | | |
|---|---|---|
| DE | 3639266 A1 | 11/1986 |
| EP | 0432923 | 6/1991 |

(Continued)

OTHER PUBLICATIONS

PCT International Preliminary Report on Patentability dated Feb. 7, 2013; Application No. PCT/EP2011/003736.
PCT International Search Report & the Written Opinion dated Jun. 6, 2012; Application No. PCT/EP2011/003736.
European Communication dated Mar. 12, 2013; Application No. 11746457.8-1302.
Notice of Opposition dated Apr. 23, 2015; European Patent No. EP2553034.
Opposition dated Apr. 23, 2015; European Patent No. 2553034.
Notice of Opposition dated Mar. 31, 2015; European Patent No. EP2553035.
Mechanical Properties of Epoxy—Polyurethane Polymer Blends Dated Dec. 3, 2006; Kh,R.AL Rawi; Um-Salama Science Journal; vol. 3.
Shape Memory Epoxy: A Systematic Study of their Performance; 2009; Ingrid A. Rousseau; vol. 7289.
Army Research Laboratory; Interpenetrating Polymer Network (IPN) Adhesives for Electron Beam Cure; James M. Sands; Sep. 2000.

(Continued)

*Primary Examiner* — Margaret Moore
(74) *Attorney, Agent, or Firm* — The Dobrusin Law Firm, P.C.

(57) ABSTRACT

A solid, dry to the touch at ambient temperature, heat curable, generally non-foaming structural adhesive that exhibits shape memory characteristics. The adhesive can be cured at an elevated temperature and contains a high molecular weight polymeric constituent that can be oriented such that at an elevated temperature below the curing temperature the material will shrink in one plane while increasing its thickness at a temperature in the range of from above the elevated temperature to below the curing temperature.

18 Claims, No Drawings

(56) References Cited

U.S. PATENT DOCUMENTS

| | | |
|---|---|---|
| 2009/0085379 A1 | 4/2009 | Takahashi et al. |
| 2009/0131557 A1 | 5/2009 | Uyama et al. |
| 2009/0280330 A1* | 11/2009 | Xie et al. .......... 428/413 |
| 2011/0098382 A1 | 4/2011 | Czaplicki |
| 2011/0215632 A1 | 9/2011 | Gleyal |
| 2012/0111488 A1 | 5/2012 | Sheasley et al. |
| 2012/0205029 A1 | 8/2012 | Riley |
| 2013/0056153 A1 | 3/2013 | Czaplicki |
| 2013/0133771 A1 | 5/2013 | Richardson et al. |
| 2013/0206333 A1 | 8/2013 | Czaplicki |

FOREIGN PATENT DOCUMENTS

| | | |
|---|---|---|
| EP | 0622833 A1 | 4/1994 |
| EP | 1155084 A1 | 11/2001 |
| EP | 0973840 B1 | 3/2003 |
| EP | 0703931 B1 | 10/2003 |
| EP | 1658319 B1 | 8/2004 |
| EP | 1900787 | 3/2008 |
| EP | 1900787 A2 * | 3/2008 |
| EP | 2182025 A1 | 5/2010 |
| JP | 6-41435 A * | 2/1994 |
| WO | 94/29358 | 12/1994 |
| WO | 97/11122 | 3/1997 |
| WO | 98/45382 | 10/1998 |
| WO | 00/02968 | 1/2000 |
| WO | 00/27920 | 5/2000 |
| WO | 2005/019285 A1 | 3/2005 |
| WO | 2009/016106 A1 | 2/2009 |
| WO | 2009/098141 A1 | 8/2009 |
| WO | 2009/124709 | 10/2009 |
| WO | WO 2009/124709 A1 * | 10/2009 |
| WO | 2010/011705 A1 | 1/2010 |
| WO | 2011/117398 A1 | 9/2011 |
| WO | 2011/117402 A1 | 9/2011 |

OTHER PUBLICATIONS

Synthesis and Properties of Polyurethane Acrylate/Epoxy Resin Interpenetrating Polymer Networks; Chinese Journal of Polymer Science; vol. 6, No. 3; 1988.
R.E. Touhsaent, D.A. Thomas, and L.H. Sperling: "Epoxy/Acrylic Simultaneous Interpenetrating Networks" J. Polymer Sci.: Symposium, Nr. 46, 1974, Seiten 175-190.
International Preliminary Report on Patentability dated Oct. 2, 2012; Application No. PCT/EP2011/054642.
International Search Report dated May 30, 2011; Application No. PCT/EP2011/054647.

* cited by examiner

ORIENTED STRUCTURAL ADHESIVES

CLAIM OF BENEFIT OF FILING DATE

The present application claims the benefit of the filing date of PCT Application Serial No. PCT/EP2011/003736 (filed Jul. 26, 2011) (Published as WO 2012/013330), which claims priority to GB 1012595.3(filed Jul. 27, 2010), the contents of both of these application being hereby incorporated by reference in their entirety.

The present invention relates to improvements in or relating to heat activatable structural adhesives and articles incorporating the same. In particular the invention relates to structural adhesives which are dry at ambient temperature and are used for bonding components in the automotive and aircraft industries although the adhesives have uses in other industries. Heat activatable structural adhesives are known from, for example WO 2009/124709. The adhesives are typically pastes or liquids to enable them to be dispensed between two items to be bonded such as metal panels that are to be welded together.

Structural adhesives are often used for bonding together similar or dissimilar materials such as metals and/or plastics. In many instances the adhesive is required to provide a bond across a pre defined gap between the members to be bonded together. In this instance it is not possible to supply the adhesive between the members and then press the members together to wet the surfaces that require bonding.

It has therefore been proposed to use foamable structural adhesives so that the adhesive may be provided between the members and may be expanded (foamed) and activated so that the expansion fills the gap between the members and at the same time develops adhesive properties to bond the two members to secure them together. The provision of a foamable adhesive has the disadvantage that the foamed structure reduces the strength and stiffness of the structural adhesive by introducing porosity into the structural adhesive.

It is generally known that high molecular weight polymers can be oriented during processing, particularly, but not exclusively, by melt processing. Orientation can be an undesirable outcome of processing. However, in some other instances, orientation can be beneficial and in others it is neither positive nor negative. As a result of orientation, when the polymer is exposed to elevated temperatures, it is possible for the material to relax the orientation due to the increased molecular mobility at the elevated temperature. The outcome is that the shape of an article constructed from an oriented material changes as a result of elevated temperature exposure. Oriented polymer chains are frozen into a lower entropy, more highly ordered state. Exposure to elevated temperatures enables increased molecular movement, and it provides the possibility for molecular re-orientation into a higher entropic, more random state. The net result is that an article constructed from an oriented polymer material can shrink in the directions of orientation and thereby increase in thickness in non-oriented directions. The greater the degree of orientation the greater the degree of shrinkage that can be accomplished.

In practice, a polymeric material can be oriented in a number of ways. For example, a material can be predominantly uni-axially oriented. In this case, when heated, the article will decrease in width in the direction lateral to orientation, but in turn increase in thickness. It is also possible for the material to be bi-axially oriented within a plane. This kind of orientation can be obtained when a material is pressed between parallel platens, for example. It also occurs in forming operations such as blow molding and various film manufacturing processes. If the material within an article is bi-axially oriented on heating, it will shrink in both dimensions within the plane of orientation and increase in thickness. Of course, there are an unlimited number of possibilities for degrees of orientation between completely uni-axial and perfectly bi-axial orientation. As can be easily imagined, a material that is bi-axially oriented can produce a greater thickness increase when the orientation is relaxed than a material that is only uni-axially oriented because orientation is being relaxed from two directions.

The present invention therefore provides a dry heat activatable structural adhesive which can be activated to develop adhesive properties at a first elevated temperature comprising a formulation containing a polymer which may be oriented at a second temperature that is below the first elevated temperature and which shrinks in at least one direction and increases in thickness in a transverse direction when heated to a temperature between the first and second temperatures.

By dry we mean is dry and not tacky to the touch at ambient temperature.

The present invention therefore employs the ability of orientable polymer systems to change their shape to provide structural adhesives that overcome the problems previously described.

The structural adhesive composition therefore contains some constituent, or constituents, that enable the formulated composition to be capable of orientation. The application of such an adhesive composition should include a processing operation that imparts orientation into the material. If the material is formed in such a way that no orientation is created during the forming operation, then there will be no change in dimension or shape memory effect when the material is heated whether the material possesses the capability for orientation or not. The orientation can be caused by the primary processing operation such as extrusion, injection molding, or blow molding, or a secondary processing operation such as compression molding, calendaring or stretching. Accordingly, the adhesive composition should be formed in a predictable and repeatable way to obtain the required degree of orientation and thus the required increase in thickness upon heating. Thus, control of process conditions will be an important factor influencing the final shape of the product.

Structural adhesive materials are typically liquids, or pastes, prior to curing. The liquid and paste materials would typically not be capable of significant orientation. While it is conceivable that structural tapes and films can be oriented, it would not provide the same benefits as those derived from a material that is dry and rigid prior to cure. Because of the difficulty for previous dry structural bonding materials to have contact with two intended bonding surfaces before curing, the ability for the material to increase its thickness as a result of heat exposure according to the present invention is particularly useful. The particularly useful characteristic of the shape memory effect is that it can enable the structural adhesive material to increase in thickness thus bridging the gap between opposing surfaces which are to be adhered together without the need to introduce porosity into the material. Porosity causes a reduction in both the strength and stiffness of the structural bonding material, and higher percentages of porosity will result in greater degrees of physical property reduction. Although not preferred, the benefit of the shape memory characteristic employed in this invention could be coupled with foaming to allow the structural bonding material to span a larger gap than would be practical, either through foaming alone, or from the shape memory characteristic alone. This may be employed to improve the strength and stiffness compared to that obtained from a system where the increase in thickness is caused only by foaming.

Therefore, the invention provides in certain embodiments a structural adhesive that is dry and can be moulded at temperatures below that at which it cures containing a shape memory material that enables contact with an opposite surface to be obtained without the need to create a porous material. We have found that materials can be produced which have a degree of thickness increase upon heating of from 25% to 500% typically a 100% to 500% increase.

The adhesive of this invention can be used to replace welding, for example, automobile manufacture, and is particularly useful for bonding together dissimilar materials with a bond of adequate strength. The heat activated structural adhesive assists in providing various properties including structural reinforcement, adhesion, sealing, acoustical damping properties or a combination thereof within a cavity of, or upon a surface of a structure, or to one or more structural members (e.g., a body panel or structural member) of an article of manufacture (e.g., an automotive vehicle or an aircraft) particularly within a weld flange. As used herein, the phrase structural adhesive includes any material that may be activated by heat to cure and develop adhesive properties (e.g., thermoset). The material will cure and will in addition change shape upon exposure to heat to come in to contact with and provide adhesion to an opposite surface.

Common applications for activatable structural adhesives are in weld seams and weld flanges in automotive vehicles, and also hem flanges. In some instances, a continuous band of structural adhesive is provided to supplement the strength, stiffness, and fatigue durability of sections that have been spot welded. Welding is a time consuming and expensive process, and in a typical automobile assembly operation, several thousands of spot welds may be required. There is therefore an incentive not only to increase the strength, stiffness, and durability of the welded segment, but also to reduce the number of welds that are required in any particular location and in a vehicle overall. Therefore, to increase assembly efficiency and to reduce assembly costs, it would be desirable to reduce the number of welds used to manufacture a vehicle. An additional benefit of the present invention is that the adhesive can be used to bond dissimilar materials that cannot be welded. For example it is sometimes not possible to weld dissimilar materials such as steel and aluminium and it is also not possible to weld certain polymers and polymer composites. The adhesives of the present invention have been found to be capable of bonding together such dissimilar materials to provide a bond of adequate strength.

Structural adhesives are also used to improve the stiffness of automobiles so reducing the likelihood of vehicle roll over, improving vehicle ride characteristics and increasing vehicle durability and fatigue life.

The heat activatable structural adhesive of the present invention may be applied to various articles of manufacture for adding structural integrity to portions or members of articles, while sometimes sealing the articles as well. Examples of such articles of manufacture include, without limitation, household or industrial appliances, furniture, storage containers, buildings, structures or the like. In preferred embodiments, structural adhesive is used for bonding portions of an automotive vehicle or aircraft such as body or frame members (e.g., a vehicle frame rail) of the automotive vehicle.

In a further embodiment the invention provides the use of the structural adhesive to bond two components wherein the adhesive is spread on a first component at the second temperature in a manner whereby the orientation in the polymer, which may be uniaxial or bi-axial is parallel to the surface of the component, and the system is heated whereby the adhesive shrinks longitudinally and expands in the perpendicular direction to fill the gap between the components and the formulation is then heated to the first elevated temperature whereby it develops its adhesive properties to bond the two components together.

The adhesive may be provided to the first component as a preformed article, or may be extruded directly on the surface of the component. The provision of the adhesive must however be performed in a manner that ensures the orientation of the polymer is or remains parallel to the surface of the first component. The heating to the second and first temperatures may be achieved in a continuous manner such as passage through an oven.

The polymer capable of orientation in the structural adhesive preferably comprises a high molecular weight solid resin particularly a high molecular weight elastomer. The polymer may also be the polymer that develops adhesive properties at the first elevated temperature; alternatively a second material can provide the adhesive properties. Where more than one polymer is used the polymers should be compatible. Example of polymers capable of orientation include an elastomer preferably an aromatic or polar elastomer such as a nitrile rubber, a styrene butadiene rubber, an acrylic elastomer or a polyurethane elastomer or other high molecular weight polymers preferably those which are compatible with epoxy resins.

The adhesive preferably also comprises an impact modifier to provide an impact resistant adhesive. However, the material used to help create the orientation may also serve a second role and also act as an impact modifier. Suitable impact modifiers include core shell polymers, modified epoxies such as a rubber modified epoxy, urethanes, and polyurethane prepolymers. The adhesive may also include a curing agent for the resin and/or polymer that develops adhesive properties at the first elevated temperature such as an epoxy resin such as a bisphenol A based epoxy resin, EPN or ECN epoxy resin or an adduct of an epoxy resin and carboxyl terminated rubber The structural adhesive may contain other components and is preferably formulated to be solid and dry to the touch at ambient temperature. For example, the material dryness may be enhanced by the use of fillers, particularly high surface area fillers, the reduction or elimination of liquid ingredients, or the inclusion of fibers, and other elastomeric and/or thermoplastic materials.

Typical performance characteristics expected of a structural adhesive include good lap shear, high T-Peel strength, and good performance in the Wedge Impact Test. In addition, it is desirable that these properties are maintained over the range of temperatures and environmental conditions to which the adhesive may be subjected. Other desirable properties include good adhesion durability under various types of exposure conditions such as high humidity, salt water and high and low temperatures with maintenance of the physical properties over time. In certain applications, a high elastic modulus, a high Tg, high strain to failure and other physical properties may be desired. The structural adhesives of this invention can typically have an elastic modulus greater than 1 GPa and a lap shear strength greater than 10 MPa, more typically an elastic modulus greater than 2 GPa and a lap shear strength greater than 30 MPa.

Ingredients that may be used in the structural adhesives of this invention are discussed below.

An epoxy elastomer adduct may be used to impart flexibility and impact resistance to the structural adhesive and the ability to initiate plastic deformation. Various epoxy/elastomer adducts may be employed in the present invention. The epoxy/elastomer hybrid or adduct may be included in an amount of up to about 50% by weight of the structural adhesive. The epoxy elastomer adduct is approximately at least 5%, more typically at least 7% and even more typically at least 10% by weight of the activatable material and more preferably about 5% to 20% by weight of the adduct based on the structural adhesive. The elastomer-containing adduct may be a combination of two or more particular adducts and the adducts may be solid adducts, semi-solids, or liquids at a temperature of 23° C. or may also be combinations thereof. A solid adduct is preferred in one preferred embodiment because a solid adduct helps create a material that is dry to the touch. The adduct is composed of substantially entirely (i.e., at least 70%, 80%, 90% or more) of one or more adducts that are solid at a temperature of 23° C. We have found unexpectedly that when the adduct is used together with a core/shell polymer and a phenoxy resin desirable adhesive performance can be achieved over a wide range of temperatures employing a relatively small amount of the adduct. This lower amount of adduct such as 5% to 15% by weight imparts higher temperature stability to the structural adhesive since there is little undesirable lowering of the Tg of the formulation.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 30% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxyl-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-containing adduct is included to modify structural properties of the structural adhesive such as strength, toughness, stiffness, flexural modulus, and the like. Additionally, the elastomer-containing adduct may be selected to render the activatable material more compatible with coatings such as water-borne paint or primer system or other conventional coatings.

A phenoxy resin may be used as the high molecular weight resin capable of orientation. Phenoxy resins are high molecular weight thermoplastic condensation products of bisphenol A and epichloro-hydrin and their derivatives. Typically the phenoxy resins that may be employed are of the basic formula

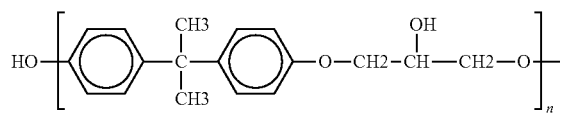

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the structural adhesive the phenoxy resin may be supplied to the other components as a solution. While any solvent may be used, it is particularly preferred to use a liquid epoxy resin as the solvent as this can also contribute to the adhesive properties upon activation. We prefer to use more than 30% by weight of the phenoxy resin based on the weight of the structural adhesive.

A core/shell polymer may be used as the impact modifier. As used herein, the term core/shell polymer denotes a polymeric material wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. The core/shell polymer should be compatible with the other components of the formulation and preferably has a ductile core and a rigid shell which is compatible with the other components of the structural adhesive formulation.

The first and second polymeric materials of the core/shell polymer can include elastomers, polymers, thermoplastics, copolymers, other components, combinations thereof or the like. In preferred embodiments, the first polymeric material, the second polymeric material or both include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like.

Preferred core/shell polymers are formed by emulsion polymerization followed by coagulation or spray drying. It is also preferred for the core/shell polymer to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core-shell graft copolymers are those where monomers, such as styrene, acrylonitrile or methyl methacrylate, are grafted onto a core made from polymers of soft or elastomeric compounds such as butadiene or butyl acrylate. U.S. Pat. No. 3,985,703, describes useful core-shell polymers, the cores of which are made from butyl acrylate but can be based on ethyl isobutyl, 2-ethylhexyl or other alkyl acrylates or mixtures thereof. The core polymer, may also include other copolymerizable compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion is preferably polymerized from methyl acrylates such as methyl methacrylate and optionally other alkyl acrylates and methacrylates, such as ethyl, butyl, or mixtures thereof acrylates or methacrylates as these materials are compatible with the phenoxy resin and any epoxy resins that are used in the formulation. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096, 202; 4,034,013; 3,944,631; 4,306,040; 4,495,324; 4,304, 709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

Examples of useful core/shell polymers include, but are not limited to those sold under the tradename, PARALOID, commercially available from Rohm & Haas Co. One particularly preferred grade of PARALOID impact modifier has a polymethyl methacrylate shell and an MBS core modifier and is sold under the designation EXL-2650; the product E-950 solid by Akema may also be used with equal effectiveness. Typical concentration of core/shell polymer would be between 5% and 30% based on the weight of the formulation.

One or more curing agents are included in the structural adhesive of this invention. The curing agent will cause the polymer that develops adhesive properties at the first elevated temperature to cure (set) at the first elevated temperature. Optionally curing agent accelerators may also be included. The amounts of curing agents and curing agent accelerators used can vary widely depending upon the type of structure desired, and the desired properties of the structural adhesive. Exemplary ranges for the curing agents or curing agent accelerators present in the structural adhesive range from about 0.001% by weight to about 7% by weight.

Preferably, the curing agents assist the activatable material in curing by cross-linking of the polymers that provides the adhesive properties, such as a phenoxy resin, an epoxy resin or both and any epoxy resin that may be present. It is also preferable for the curing agents to assist in thermosetting the material that is activatable at the first elevated temperature. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetriamine, diethylenetriamine tetraethylenepentamine, cyanoguanidine, dicyandiamides and the like. If an accelerator for the curing agent is used examples of suitable materials include a modified or unmodified urea such as methylene diphenyl bis urea, an imidazole, or a combination thereof.

The high molecular weight heat activatable resin may also be or include an epoxy resin. Epoxy resin is used herein to mean any of the conventional dimeric, oligomeric or polymeric epoxy materials containing at least one epoxy functional group. Important current epoxy content is more than 40%. Moreover, the term epoxy resin can be used to denote one epoxy resin or a combination of multiple epoxy resins. The polymer-based materials may be epoxy-containing materials having one or more oxirane rings polymerizable by a ring opening reaction. In preferred embodiments, the activatable material includes between about 2% and 75% by weight epoxy resin, more preferably between about 4% and 60% by weight epoxy resin and even more preferably between about 25% and 50% by weight epoxy resin. Of course, amounts of epoxy resin may be greater or lower depending upon the intended application of the structural adhesive.

The epoxy resin may be aliphatic, cycloaliphatic or aromatic or the like. The epoxy may be supplied as a solid (e.g., as pellets, chunks, pieces or the like) or a liquid (e.g., an epoxy resin) although solid resins are preferred. A liquid resin can sometimes be employed as a solvent for another component of the formulation such as a phenoxy resin or another high molecular weight resin such polysulfone or polyethersulfone. As used herein, unless otherwise stated, a resin is a solid resin if it is solid at a temperature of 23° C. and is a liquid resin if it is a liquid at 23° C. The epoxy may be included as part of an ethylene copolymer or terpolymer. A copolymer is a polymer composed of either two or three respectively different monomeric units.

An epoxy resin may be added to the activatable material to increase the adhesion, flow properties, or both, of the material. One exemplary epoxy resin may be a phenolic resin, which may be a novolac type or other type resin. Other preferred epoxy containing materials may include a bisphenol-A epichlorohydrin ether polymer, or a bisphenol-A epoxy resin which may be modified with butadiene or another polymeric additive or bisphenol-F-type epoxy resins. Moreover, various mixtures of several different epoxy resins may be employed as well. Examples of suitable epoxy resins are sold under the tradename Araldite GY 282, GY 281 and GY 285 supplied by Huntsman.

The compositions of this invention may contain other ingredients such as one or more of the following i) polymers;

ii) filler;

iii) flow control materials and iv) nano particles v) adhesion promoters vi) fibers vii) flame retardants viii) pigments ix) anti-oxidants x) Cure accelerators Polymer or Copolymer Depending upon the use to which the structural adhesive is to be put, it may include one or more additional polymers or copolymers, which can include a variety of different polymers, such as thermoplastics, elastomers, plastomers and combinations thereof or the like. For example, and without limitation, polymers that might be appropriately incorporated into the structural adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polyurethane, polysiloxane, polyether, polyphosphazine, polyamide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid, polymethacrylate.

When used, these polymers can comprise a small portion or a more substantial portion of the material. When used, the one or more additional polymers preferably comprises about 0.1% to about 50%, more preferably about 1% to about 20% and even more preferably about 2% to about 10% by weight of the activatable material.

In certain embodiments, it may be desirable to include one or more thermoplastic polyethers and/or thermoplastic epoxy resins in the structural adhesive. When included, the one or more thermoplastic polyethers preferably comprise between about 1% and about 50% by weight of the structural adhesive, more preferably between about 3% and about 5% by weight of the structural adhesive. As with the other materials, however, more or less thermoplastic polyether may be employed depending upon the intended use of the structural adhesive. The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 60 grams per 10 minutes for samples weighing 2.16 Kg at a temperature of about 190° C. Of course, the thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

According to one embodiment, the thermoplastic polyether is formed by reacting a primary amine, a bis (secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). According to another embodiment, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464924 and 5,962,093.

Advantageously, the thermoplastic polyethers can provide the structural adhesive with various desirable characteristics such as desirable physical and chemical properties for a wide variety of applications as is further described herein.

Although not required, the formulation may include one or more ethylene polymers or copolymers such as ethylene acrylate copolymers, ethylene vinyl acetate copolymers. Ethylene methacrylate and ethylene vinyl acetate are two preferred ethylene comonomers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

Filler

The structural adhesive may also include one or more fillers, including but not limited to particulate materials (e.g., powder), beads, microspheres such as Zeospheres available from Zeelan Industries, or the like. Preferably the filler includes a material that is generally non-reactive with the other components present in the structural adhesive. While the fillers may generally be present within the structural adhesive to take up space at a relatively low weight or cost, it is contemplated that the fillers may also impart properties such as strength and impact resistance to the structural adhesive.

Examples of other fillers that may be used include silica, diatomaceous earth, glass, clay (e.g., including nanoclay), talc, pigments, colorants, glass beads or bubbles, glass, carbon or ceramic fibers, nylon or polyamide fibers (e.g., Kevlar), and the like. Such fillers, particularly clays, can assist the activatable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers in the activatable material can range from 5 wt % or less to 50 wt % or greater preferably 10 wt % to 25 wt % of the structural adhesive formulation. According to some embodiments, the structural adhesive may include from about 0.5 wt % to about 3% by weight, and more preferably slightly less that 1% by weight clays or similar fillers in order to control the melt viscosity of the formulation. Powdered (e.g. about 0.01 to about 50, and more preferably about 1 to 25 micron mean particle diameter) mineral type filler can comprise between about 5% and 50% by weight, more preferably about 10% to about 30% by weight.

Other Components and Additives

It is contemplated that most nearly any additional chemical, material or otherwise may be added to the structural adhesive assuming they are suitable for the chosen application of the structural adhesive.

Other additives, agents or performance modifiers may also be included as desired, including but not limited to an antioxidant, a UV resistant agent, a flame retardant a heat stabilizer, a colorant, a processing aid, a lubricant, a reinforcement (e.g., chopped or continuous glass, ceramic, aramid, or carbon fiber, particulates or the like). Liquid polysufides may be used to improve the environmental exposure of the adhesive such as exposure to humidity and salt water.

When determining appropriate components for the heat activatable structural adhesive, it may be important to form the material such that it will only activate at appropriate times or temperatures. For instance, the material should not be reactive at ambient temperature in an assembly environment. The structural adhesive becomes activated at a first higher processing temperature and changes shape at a second lower processing temperature. As an example, temperatures such as those encountered in an automobile assembly plant may be appropriate, especially when the structural adhesive is processed along with the other components at elevated temperatures or at higher applied energy levels, e.g., during painting preparation steps. Temperatures encountered in many coating operations (e.g., in a paint and/or e-coat curing oven), for instance, range up to about 250° C. or higher, although 150° C. to 200° C. temperatures are common and the adhesive can change shape at an intermediate temperature and develop adhesive properties at a higher temperature within that range.

We have found that adhesive formulations that can shrink within a plane, either uni-axially or bi-axially, can increase in thickness by more than two times their original thickness.

The relative proportions of the materials that should be used will depend upon the use envisaged for the activatable material. We prefer however to use from 40% to 80 wt % more preferably from 50 wt % to 75 wt % of the orientable polymer and the resin that develops adhesive properties or one material that performs both functions may be employed. From 10% to 25% of an impact modifier and from 0.5 to 10% of the curing agent. Preferred amounts of the other optional ingredients are as follows; 5% to 75%, preferably 10 to 25 wt % of one or more epoxy resins, 0.2% to 3% of a cure accelerator, 0.1% to 50% filler, 0.1% to 3.0% clay and/or silica.

Formation and Application of the Structural Adhesive

Formation of the structural adhesive can be accomplished according to a variety of techniques. According to one embodiment, the structural adhesive is formed by supplying an orientable polymer which may also be the polymer that develops adhesive properties and optionally an impact modifier in solid form such as pellets, chunks and the like and melt blending with the curing agent at a temperature below that at which the curing agent is activated. Alternatively, if a phenoxy resin is used, a solution of the phenoxy resin in a liquid epoxy resin may be used and optionally blended with an impact modifier such as a core/shell polymer, the fillers may then be added, and finally the curing agent and optionally any curing agent accelerator are added and mixed, preferably under vacuum to remove any entrapped air. These materials are typically compounded using equipment capable of compounding high viscosity materials. Examples include sigma blade mixers, or Banbury-style intensive mixers. The material can be processed continuously using a single screw extruder with a compounding screw, twin screw extruder, or a kneader-extruder. The material can be made directly into articles by extrusion for example, or it can be pelletized for further processing by injection molding, blow molding, or other processes.

It is important to assure that during formulation the temperature of the mixture being compounded remains below the curing temperature once the curing agents have been added. In the embodiment where the adhesive is also expandable formulation should occur at temperatures below that at which expansion occurs (such as the decomposition temperature of a blowing agent used for expansion).

In use of the structural adhesive of the present invention an article such as a strip of the adhesive formulation of thickness similar to the or slightly thicker than the desired thickness of the final cured adhesive may be formed. The article may then be compressed in a way that orients the orientable component in the formulation. In this way it is possible to produce an adhesive component of the required shape in which the orientable polymer is oriented during its processing. The compressed moulding may then be laid up with the components that are to be bonded together and heated to first cause the oriented polymer to shrink in the plane of orientation and expand back to the required thickness to bridge the gap between the components. The adhesive may then cure as heating continues. The heating to fill the gap between the components and cure the material may be accomplished in an E-coat oven, or a paint oven that are often used in industrial manufacturing operations. The adhesive is formulated to change shape and to be activated at the desired temperature. In automobile manufacture, the activation typically occurs at elevated temperatures in the range 140° C. to 220° C., typically 140° C. to 200° C. The time required for heat exposure depends upon the temperature employed, with 30 minutes being a typical time duration within the oven. The structural adhesive may be extruded in place at the location where it is to perform and in this instance the orientable polymer can become oriented by the extrusion process, or by deforming the material following extrusion.

Depending upon the intended application, the structural adhesive may be applied and activated in different ways and at different times. The material may be formed into a strip and applied by hand, or mechanically, to wherever it is to be used. The material may be extruded onto the position where it is used. Thus, exemplary uses of the structural adhesive are discussed below to illustrate preferred methodologies of application and activation of the activatable material. In particular, the structural adhesive may be used for, amongst others, reinforcement, sealing and adhering or the like.

Reinforcement

The structural adhesive may be used to reinforce structural members of an article of manufacture. When used for reinforcement, the structural adhesive may be employed by itself, it may be employed in conjunction with other materials (e.g., a backing), may be applied to a carrier member or the like. The structural adhesive is particularly useful to enable substitution of welding by structural bonding which constitutes a preferred use.

According to one embodiment, the structural adhesive of the present invention is applied to a carrier member to form a reinforcement member and the reinforcement member is inserted within a cavity formed by a structural member of an automotive vehicle. The structural member of the automotive vehicle may be nearly any member of the vehicle including, but not limited to, frame members, body member, pillar structures, closure panels, roof assemblies, bumpers, combinations thereof, or the like.

The carrier member may be selected from a variety of conventional and novel configurations. The structural adhesive of the present invention may thus be applied to a carrier member, such as a molded, extruded or stamped member (e.g., metal or plastic, foamed or unfoamed; exemplary materials of which include aluminum, magnesium, titanium, steel, molding compound (e.g., sheet or bulk molding compound), polyamide (e.g., nylon 6 or nylon 6,6), polysulfone, thermoplastic imide, polyether imide, polyether sulfone or mixtures thereof.

The materials of the present invention have been found to be effective structural adhesives which have desirable performance over an extended temperature range particularly in the Wedge Impact Test. The materials have been found to maintain their adhesive properties over an extended period of time and to be effective in humid or salt spray environments. They are useful for structural bonding in a variety of applications such as the automotive, aircraft, aerospace, railroad vehicles, trucks, busses, sports goods, construction and furniture industries. They have been found to be particularly useful for the purpose of weld substitution.

The adhesive of the present invention do not require blowing agents and do not rely on foaming to produce contact to an opposing surface although adhesives which both foam and expand due to shape memory are envisaged. The formulation is adjusted to change shape and develop the adhesive properties at the desired temperature according to the use to which the adhesive is to be put. For example, if the adhesive is to be used to bond together components at temperatures experienced in the paint bake or anti corrosion ovens employed in automobile manufacture the formulation can be established to change shape and develop adhesive properties at between 120° C.-220° C. Similarly, if the adhesive is to be used for bonding components employed in aircraft manufacture, the formulation can be adjusted to change shape and develop adhesive properties at the desired temperature.

The present invention is illustrated by reference to the following examples.

The lap shear test is a modification of ASTM D-1002 and involves taking two galvanized steel coupons, providing a piece of the adhesive in between the metal coupons and curing the material. The bondline is the thickness of the material between the metal compounds following curing. The overlap area of the two pieces of metal in this case is 12.5 mm×25 mm. The metal coupons are gripped in a mechanical testing machine and pulled apart. The maximum stress is measured by dividing the peak load by the overlap area.

The T-peel test is a modification of ASTM D-1876 in which two galvanized steel coupons are bent to an L-shape. Uncured adhesive is provided onto the long part of the coupon. The two metal coupons are put together to make a T-shape. The metal coupons are cured to create a T-shaped test specimen. The bondline is the thickness of the cured material. The overlap area with adhesive is 25 mm by 100 mm. The two legs of the T-shape are put into testing grips in a mechanical testing machine and pulled apart. The average force per material width is calculated from this test.

The tensile strain to failure was measured by performing a tensile test on cured structural bonding material. A sheet of flat structural bonding material is first prepared, with a material coupon then produced from this sheet. An example of a suitable test method for obtaining a strain to failure measurement is ISO 527-2/1B/10.

EXAMPLES

The formulations set out in the Table below were prepared and processed to produce coupons 25 mm long and 25 mm wide and 3 mm thick. The coupons were compressed to a thickness of 1 mm which caused the formulated material to orient within the plane of the coupon. The compressed material was then placed between two pieces of metal held about 3 mm apart and the assembly heated to 180° C. in an oven for 30 minutes. The coupon of the adhesive formulation increased in thickness to fill the gap between the pieces of metal and then so that it bonded the coupons together. The degree of expansion (height increase) of the adhesive and the Lap Shear, T-Peel are set out below:

The following materials were used
(i) a Phenoxy masterbatch comprising 70% of the Phenoxy Resin PKHJ (the orientable polymer) and 30% Epalloy 8220
(ii) Araldite 1522ES—an epoxy resin
(iii) Paraloid EXL 2650 a methylacrylate/butadiene/styrene co polymer impact modifier
(iv) Amicure CG 1200 (Dicyandiamide curing agent)
(v) Nipol 1002 (butadiene, acrylacrylonitrile copolymer)
(vi) SBR 1009 (styrene butadiene rubber)
(vii) Zeon Nipol N41 H80 (nitrile rubber)
(viii) Dynapol-S-1401 (linear copolyester)
(ix) Nanopox A510 (colloidal silica in a resin matrix)
Percentages are wt % of the formulation

|  | Example | | | | |
| --- | --- | --- | --- | --- | --- |
|  | 1 | 2 | 3 | 4 | 5 |
| Phenoxy Resin Masterbatch | 59.3 | 51.9 | 56.1 | 49.4 | 59.4 |
| Araldite 1522 ES | 17 | 14.8 | 16.1 | 14.2 | 14.3 |
| Paraloid EXL 2650 | 17 | 14.8 | 16.1 | 14.2 | 14.3 |
| Amicure CG-1200 | 6.7 | 5.9 | 6.3 | 5.7 | 5.7 |
| Nipol 1002 |  |  | 5.4 |  |  |
| SBR 1009 |  |  |  | 30 |  |
| Zeon Nipol N41H80 |  | 6.3 |  |  | 6.1 |
| Dynapol S-1401 |  | 6.3 |  |  |  |
| Nanopox A-510 |  |  |  | 7.5 |  |
| Properties |  |  |  |  |  |
| Height Increase % |  | 326 | 200 |  | 486 |
| Lap Shear MPa |  | 34 | 33 |  | 34 |
| T-Peel MPa | 13.6 |  | 16 |  |  |

The invention claimed is:
1. A dry structural adhesive material for bonding together opposing surfaces comprising:
 a mixture of a first polymeric material and a second polymeric material that is compatible with the first polymeric material, wherein:
  i. the first polymeric material is thermohardened at a first elevated temperature;

ii. the second polymeric material is oriented and relaxed at a second elevated temperature;

wherein the second elevated temperature is lower than the first elevated temperature and the adhesive material becomes oriented and deformed at the second elevated temperature and forms a bond upon application of heat at the first elevated temperature to cure the first polymeric material;

wherein relaxation of a molecular orientation of the second polymeric material at the second elevated temperature causes the adhesive material to shrink in at least one direction and to increase its thickness in a transverse direction and thereby contact an opposing surface and develop a bond with the opposing surface at heating to the first elevated temperature; and wherein the second polymeric material includes at least 30% by weight of phenoxy resin and a polymeric constituent, and wherein the polymeric constituent is a solid resin including a nitrile rubber;

wherein the adhesive material is non-foaming; and wherein the adhesive material is dry and not tacky to the touch at ambient temperature.

2. A dry structural adhesive material according to claim 1, wherein the molecular orientation of the polymeric constituent of the second polymeric material is frozen in place prior to heat of the second elevated temperature.

3. A dry structural adhesive material according to claim 1, wherein at temperature below a cure temperature it is moulded.

4. A dry structural adhesive material according to claim 2, wherein the molecular orientation of the polymeric constituent of thee second polymeric material is produced during an injection moulding process.

5. A dry structural adhesive material according to claim 1, in which the polymeric constituent of the second polymeric material further includes an elastomer.

6. A dry structural adhesive material according to claim 1, wherein heating the adhesive material increases its thickness between 25% and 500%.

7. A dry structural adhesive material according to claim 1, wherein the adhesive material is heated to the second elevated temperature within a range of 120° C. to 220° C. and that expands the adhesive material.

8. A dry structural adhesive material according to claim 2, including a methacrylate/butane/styrene copolymer impact modifier.

9. A dry structural adhesive material according to claim 1, including a dicyandiamide curing agent.

10. A dry structural adhesive material according to claim 1, wherein heating the adhesive material increases its thickness from at least about 200% to 500%.

11. A dry structural adhesive material according to claim 1, wherein the adhesive material has a lap shear strength of at least about 33 MPa.

12. A dry structural adhesive material according to claim 1, wherein the adhesive material has a T-Peel value of 13.6 N/mm to 16 N/mm.

13. A dry structural adhesive material according to claim 2, including a dicyandiamide curing agent.

14. A dry structural adhesive material according to claim 2, wherein the adhesive material has a lap shear strength of at least about 33 MPa.

15. A dry structural adhesive material according to claim 11, wherein the adhesive material has a T-peel value of 13.6 N/mm to 16 N/mm.

16. A dry structural adhesive material according to claim 1, wherein the polymeric constituent of the second polymeric material further includes an elastomer and the elastomer is selected from a styrene butadiene rubber, an acrylic elastomer or a polyurethane elastomer.

17. A dry structural adhesive material according to claim 1, wherein the adhesive material includes about 40% by weight of phenoxy resin.

18. A dry structural adhesive material according to claim 1, wherein the adhesive material further includes epoxy resin.

* * * * *

UNITED STATES PATENT AND TRADEMARK OFFICE
CERTIFICATE OF CORRECTION

PATENT NO. : 9,683,149 B2  
APPLICATION NO. : 13/812055  
DATED : June 20, 2017  
INVENTOR(S) : Michael Czaplicki Page 1 of 1

It is certified that error appears in the above-identified patent and that said Letters Patent is hereby corrected as shown below:

In the Claims

Column 16, Line 6, delete "methacrylate/butane/styrene" and replace with --methacrylate/butadiene/styrene--

Column 16, Line 26, delete "a T-peel" and replace with --a T-Peel--

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*